US012706922B2

(12) United States Patent
Albero et al.

(10) Patent No.: US 12,706,922 B2
(45) Date of Patent: Aug. 11, 2026

(54) SYSTEM AND METHOD FOR MONITORING THREAT DETECTING MODELS

(71) Applicant: Bank of America Corporation, Charlotte, NC (US)

(72) Inventors: George Albero, Charlotte, NC (US); Jinna Kim, Charlotte, NC (US); Maharaj Mukherjee, Poughkeepsie, NY (US); Timothy Scott Murphy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 186 days.

(21) Appl. No.: 18/635,156

(22) Filed: Apr. 15, 2024

(65) Prior Publication Data

US 2025/0323922 A1 Oct. 16, 2025

(51) Int. Cl.
*G06N 20/00* (2019.01)
*G06F 21/55* (2013.01)
*H04L 9/40* (2022.01)

(52) U.S. Cl.
CPC ................................ *H04L 63/1408* (2013.01)

(58) Field of Classification Search
None
See application file for complete search history.

(56) References Cited

U.S. PATENT DOCUMENTS 10,163,061 B2 12/2018 Grove et al.
10,439,836 B2 10/2019 Rosenberg et al.
11,295,241 B1 4/2022 Badawy et al.
11,631,012 B2 4/2023 Khatami et al.
11,790,237 B2 10/2023 Mathews et al.
2007/0130188 A1* 6/2007 Moon .................. H04L 9/3236
2008/0148398 A1* 6/2008 Mezack ................ G06F 21/552 709/224
2015/0051893 A1* 2/2015 Ratcliffe, III ......... G06F 21/577 703/13
2019/0095320 A1* 3/2019 Biswas ............... G06F 11/3457
2019/0260786 A1* 8/2019 Dunn .................. H04L 63/1441
2020/0104511 A1* 4/2020 Stolfo ................... H04L 67/535
2020/0380138 A1* 12/2020 Agarwal ................. G06F 21/57
2021/0021636 A1* 1/2021 Sbandi ..................... G06N 3/09
2022/0004645 A1* 1/2022 Agarwwal ............. H04L 63/20

(Continued)

FOREIGN PATENT DOCUMENTS

CN 114092232 A 2/2022
CN 114792139 A 7/2022

(Continued)

*Primary Examiner* — Christopher B Robinson

(57) ABSTRACT

A system for monitoring threat models. The system stores test data that include activity data performed by two or more external sources. The test data includes data from at least one previous threat. The test data is updated with additional test data from at least one of two or more external sources. The additional test data includes new data associated with at least one new threat. The system receives two or more external sources from two or more threat models and implements them in a virtual test environment, which utilizes the two or more threat models to detect at least one previous threat and at least one new threat. When at least one of the two or more threat models does not detect the at least one new threat, an action is performed to modify it.

20 Claims, 2 Drawing Sheets

(56) References Cited

U.S. PATENT DOCUMENTS

| | | | |
|---|---|---|---|
| 2022/0024032 A1 | 1/2022 | Singh et al. | |
| 2022/0046047 A1* | 2/2022 | Lewis | G06F 21/554 |
| 2023/0009127 A1* | 1/2023 | Boyer | H04L 41/16 |
| 2023/0076559 A1 | 3/2023 | Sankarapu et al. | |
| 2023/0128081 A1 | 4/2023 | Tabet et al. | |
| 2023/0130376 A1 | 4/2023 | Tabet et al. | |

FOREIGN PATENT DOCUMENTS

| | | | |
|---|---|---|---|
| IN | 202221003094 | | 1/2022 |
| IN | 202221072640 | | 12/2022 |
| WO | 2021196457 | A1 | 10/2021 |
| WO | 2023139510 | A1 | 7/2023 |

* cited by examiner

SYSTEM AND METHOD FOR MONITORING THREAT DETECTING MODELS

TECHNICAL FIELD

The present disclosure generally relates to threat monitoring and, more specifically, to a system and method for monitoring threat detecting models.

BACKGROUND

Large organizations often utilize complex computing systems, such as data centers, to carry out day-to-day operations. Many applications and computing devices in these systems may be connected by local connections and/or broader networks such as the Internet. The applications are increasingly interdependent upon each other and the computing devices hosting them. This interconnection of both computing devices and the applications they support, as well as their connections with external devices through networks such as the Internet, leads to vulnerabilities that malicious actors may attack. Malicious actors constantly probe and evolve their attacks. The existing approaches to mitigate attacks by malicious actors are inefficient and quickly become obsolete.

SUMMARY

The system and method disclosed in the present application provide a technical solution to the technical problems discussed above by providing the capability to monitor threat models used by active systems automatically. The system and method determine when drift occurs in the models, such as when the models are unable to detect one or more threats due to their evolving nature. By automatically monitoring the threat models, the system and method may potentially replace or improve them before attackers can take advantage of their previous deficiencies.

In one embodiment, the disclosed system monitors threat models. The system includes a memory configured to store test data. The test data comprises activity data related to an activity performed by two or more external sources and includes activity data from at least one previous threat. The system also includes an operable processor coupled to the memory. The processor is configured to receive additional test data from at least one of the two or more external sources, including new data associated with at least one new threat. The processor then updates the stored test data to include the additional test data. The processor also receives from the two or more external sources two or more threat models, each configured to detect at least one previous threat. A virtual test environment is implemented that comprises a simulation of an active system that utilizes the two or more threat models to detect the at least one previous threat, and the updated stored test data is used in the virtual test environment to determine if each of the two or more threat models is able to detect the at least one new threat. When at least one of the two or more models is unable to detect the new threat, an action is performed to modify the at least one threat model.

The disclosed system provides several practical applications, such as providing an efficient and up-to-date system for detecting harmful code/viruses, misinformation, and other forms of attack on a computing system and/or the organization that operates the computing system. The system allows for the continuous and automatic maintenance of threat models, both built in-house and those obtained from third-party sources. It further provides for efficient updating of these models as new attacks become known outside or inside the organization. These updates or other actions may be taken before a user or operator is even aware that a problem in the current models is present. Accordingly, the disclosed system alleviates technical issues associated with running threat models that are subject to drift or becoming unable to detect the newest or most sophisticated attacks. These technical advantages improve the reliability of an organization's computer and network systems.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System for Monitoring Threat Detecting Models, Overview

Figure 1:
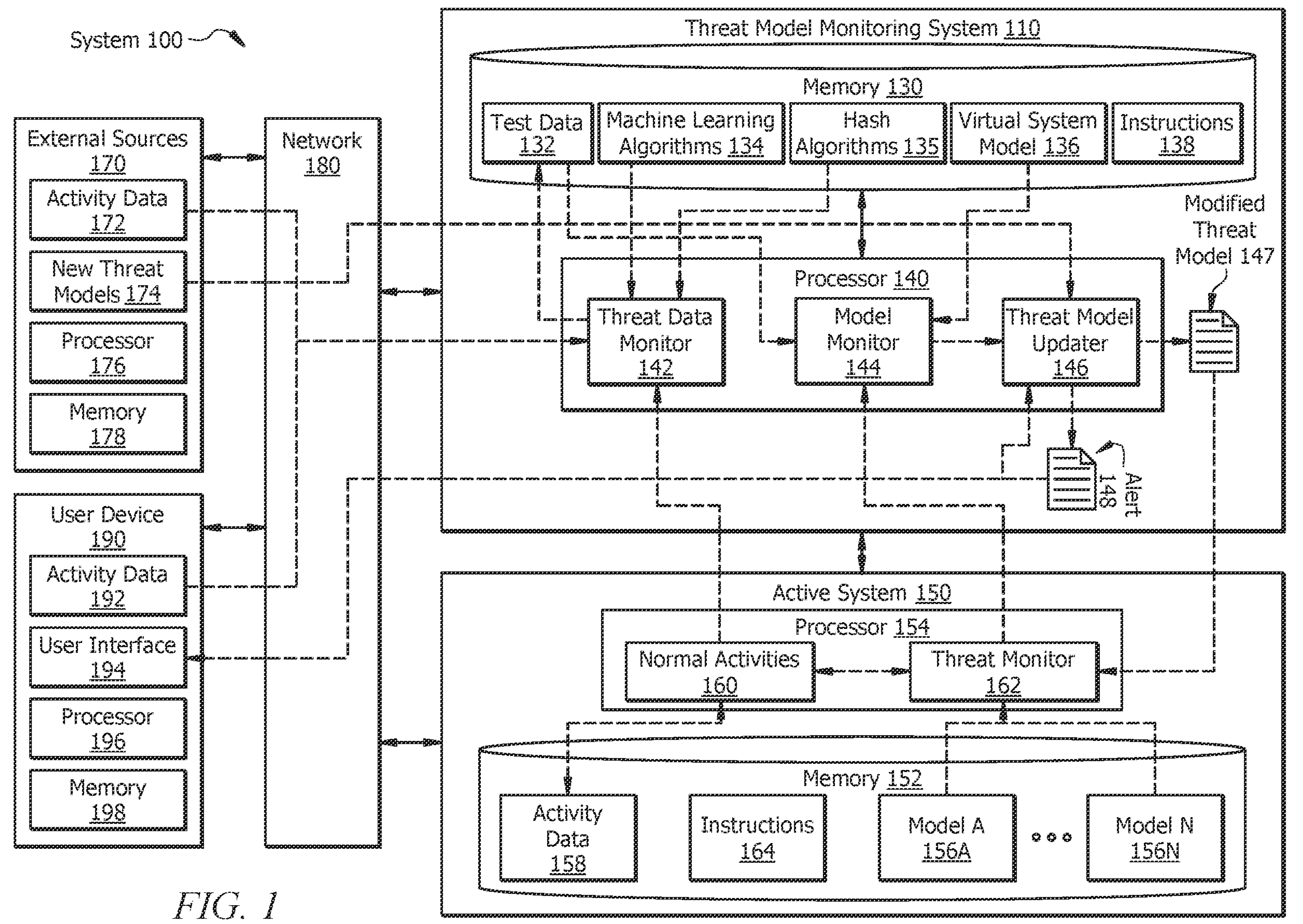
FIG. 1 illustrates one embodiment of a system configured for monitoring threat models.

FIG. 1 is a schematic diagram of a system 100 configured for monitoring threat models 156A-156N used by an active system 150. System 100, specifically the threat model monitoring system 110, is configured to identify when threat models 156A-156N drift and implement changes to threat models 156A-156N to address any drift in the threat models 156A-156N. More specifically, the threat model monitoring system 110 is configured to receive activity data, e.g., 158, from various sources such as, but not limited to, the organization's active system 150, external sources 170, and user devices 190. The activity data, e.g., 158, includes activity data from at least one previously detected threat. The activity data, e.g., 158, is analyzed and used to make and/or update test data 132, stored in memory 130. A processor 140 of the threat model monitoring system 110 creates and uses a virtual system model 136 to test the models 156A-156N using updated stored test data 132 and determines if they are able to detect all the threats in the updated stored test data 132. When at least one of the threat models 156A-156N does not detect all the threats, at least one threat model, e.g., 156A, may be updated or replaced with a new threat model 174, either from an external source 170 or from a user device 190. In one or more embodiments, the processor 140 may be directed by the user interface 194 of the user device 190 to produce or modify a threat model, e.g., 156A to create a modified threat model 147. Alternatively, the processor 140 performing a threat model updater operation 146 may automatically change one or more parameters of at least one threat model, e.g., 156A, and implement the change parameters in one or more of the models 156A-156N as a modified threat model 147.

In one or more embodiments, system 100 comprises a threat model monitoring system 110 that includes a memory 130 and a processor 140 in signal communication through a network 180 with an active system 150, an external source 170, and/or a user device 190. The active system 150 includes a memory 152 and a processor 154 and may be a live production system. The system 100 may be configured as shown or in any other suitable configuration.

External Source

In one or more embodiments, the system 100 includes two or more external sources 170. The external sources 170 may be any number of devices providing activity data 172 and/or new threat models 174. While shown separately, user devices 190 and external source 170 may both be considered external sources. The external sources may communicate with the threat model monitoring system 110 and active system 150 over a network 180. Examples of the external sources 170 include but are not limited to, computers, laptops, mobile devices (e.g., smartphones or tablets), servers, clients, or any other suitable type of devices that may collect activity data 172, produce and/or supply new models 174, or perform any other action. The external sources 170 may include memory 178 and one or more processors 176 for performing operations, including but not limited to sending to the processor 140 through the network 180, activity data 172, and/or new models 174.

In one or more embodiments, the activity data 172 may comprise multiple data sets related to the performance of one or more actions. This data may be transaction amounts, interactions with one or more applications, information entered into forms, and/or any other data needed for performing one or more actions. The activity data 172 may also take the form of logs showing the actions taken by the external sources 170, which may allow for a processor 176 to perform threat monitoring operations and any other operation the external sources 170 are designed to perform. The activity data 172 may be communicated to the processor 140 through network 180 to produce test data 132 stored in memory 130 of the threat model monitoring system 110. In one or more embodiments, the activity data 172 includes at least one data set reflecting activity data 172 that has been identified as related to at least one previous and/or current threat. Alternatively, or in addition, the activity data 172 from the external source 170 may only include activity data that has been identified as being related to at least one previous and/or current threat.

In one or more embodiments, the external sources 170 may provide new threat models 174. As described in more detail below, a threat model 156A-156N is a model that is used by the processor 154, performing a threat monitor operation 162 to detect when potential attacks are occurring by looking at patterns or types of data. Threat models 156A-156N often drift or become out of date as attacks are changed or modified to avoid being detected by the threat models 156A-156N. This requires that threat models 156A-156N be periodically replaced with new threat models 174, which may be developed by users or administrators of system 100 or from external sources 170, including third-party developers, regulators, and/or other organizations with similar threats.

User Devices

The user device(s) 190 may be any number of devices a user or administrator may use to interact with the system 100. The user device 190 may provide activity data 192, new threat models, and/or modified threat models 147 to the processor 140 of the threat model monitoring system 110. The user device 190 may interact with the threat model monitoring system 110, active system 150, and external source 170 through network 180. Examples of the user device 190 include, but are not limited to, computers, laptops, mobile devices (e.g., smartphones or tablets), servers, clients, or any other suitable type of devices that may allow a user to interact with the external sources 170, active system 150, and threat model monitoring system 110. The user device 190 may include memory 198 and one or more processors 196 for performing operations including, but not limited to, sending to the processor 140 through the network 180 activity data 192. Additionally, the user device 190 may include a user interface 194, which allows a user to receive alerts 148 from processor 140, make changes to one or more of the threat models 156A-156N, and/or modify the threat models to produce a modified threat model 147.

In one or more embodiments, the user device 190 may also receive alerts 148 from the threat model monitoring system 110 and display them to a user using user interface 194. These alerts 148 notify a user of the user device 190 that one or more changes are needed to at least one of the models, e.g., 156A. The user may then select a new model 174 from an external source 170, or the user may change or modify one or more parameters of at least one of the threat models, e.g., 156A, to produce a modified threat model 147.

Network

The network 180 may be any suitable type of wireless and/or wired network including, but not limited to, all or a portion of the Internet, an intranet, a private network, a public network, a peer-to-peer network, the public switched telephone network, a cellular network, a local area network (LAN), a metropolitan area network (MAN), a wide area network (WAN), and a satellite network. The network 180 may be configured to support any suitable type of communication protocol as would be appreciated by one of ordinary skill in the art.

The network 180 may connect the active system 150, external source 170, and user device 190 with the memory 130 and processor 140 of the threat monitoring system 110. Alternatively, network 180 may connect the threat model monitoring system 110, active system 150, external sources 170, and user devices 190 to and/or through the Internet or other large networks to each other and other components of system 100. In one or more embodiments, different elements of system 100 may be at different geographic locations and connected through network 180. While shown as a single network 180, the network 180 may comprise a plurality of components of any suitable networking equipment, including but not limited to routers and switches, that allow at least the active system 150 to communicate with the processor 140 and memory 130. Network 180 is not limited to the configuration shown in FIG. 1, which is simply shown in this form for simplicity and explanatory purposes.

Active System

The system may have one or more active systems 150. Active system 150 may take any form, including but not limited to computers, laptops, mobile devices (e.g., smartphones or tablets), servers, clients, automated teller machines (ATM), or any other suitable type of devices that may perform one or more normal activities 160. The normal activities 160 may be any activities an organization has performed, such as web applications, financial applications, database applications, and/or any other actions the organization may need to perform. The active system 150 may include at least one processor 154 that performs one or more processes or operations, including performing a threat monitor operation 162 and the normal activities 160, as well as communicating or sending activity data 158 and threat models 156A-156N to the threat model monitoring system 110 and the associated processor 140 through the network 180 for threat model monitoring and/or implementing changes to one or more of the threat models 156A-156N. While only one active system 150 is shown, the system 100 may include a plurality of active system 150, and the disclosure is not limited to the number or configuration of the active system 150 shown in FIG. 1.

The active system 150 may include at least one memory 152 for storing instructions 164 for performing the normal activities 160. The memory 152 may also store one or more threat models 156A-156N, which is used on the active system 150 to detect attacks and/or threats that occur while performing the normal activities 160. Memory 152 may also store activity data 158 from normal activities 160, which may be forwarded to the threat model monitoring system 110 as activity data 158 for use by the processor 140 for performing a threat data monitor operation 142. Memory 152 may be a non-transitory computer-readable medium for operative communication with processor 154. The memory 152 may be one or more disks, tape drives, or solid-state drives. Alternatively, or in addition, the memory 152 may be one or more cloud storage devices. The memory 152 may be volatile or non-volatile. It may comprise read-only memory (ROM), random-access memory (RAM), ternary content-addressable memory (TCAM), dynamic random-access memory (DRAM), and static random-access memory (SRAM).

In one or more embodiments, the activity data 158 may comprise multiple data sets related to the performance of one or more actions. This data may include numerical amounts, interactions with one or more applications, information entered into forms, and/or any other data needed for performing one or more normal activities 160 or actions. Activity data 158 may also take the form of log data showing the actions taken by the external sources 170, which may allow processor 154 to perform a threat monitor operation 162 using models 156A-156N. The activity data 158 may be communicated to the processor 140 through network 180 to produce stored test data 132 that is stored in memory 130 of the threat model monitoring system 110. In one or more embodiments, activity data 158 includes at least one data set that reflects activity data that has been identified as being related to at least one previous and/or current threat. Alternatively, or in addition, the activity data 158 from the active system 150 may only include activity data 158 that has been identified as being related to at least one previous and/or current threat.

In one or more embodiments, the active system 150 includes two or more threat models 156A-156N stored in memory 152. These threat models are used by the processor 154 when performing a threat monitor operation 162. A threat model or fraud model, e.g., 156A, is a model that identifies trains and historical trends associated with suspicious behavior and past attacks or frauds to detect risk. The threat models 156A-156N may compare such things as the location of an IP address with a billing address and amounts of a transaction with an expected amount. The threat models 156A-156N may also look at patterns or trends that have been found to be indicative of an attack. The threat models 156A-156N may take any form and are not limited to those described herein.

The processor 154 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 154 may be a programmable logic device, a microcontroller, a microprocessor, or any suitable combination of the preceding. The processor 154 is communicatively coupled to and in signal communication with the memory 152. One or more processors make up the processor 154 and are configured to process data, which may be implemented in hardware or software. For example, the processor 154 may be 8-bit, 16-bit, 32-bit, 64-bit, or of any other suitable architecture. The processor 154 may include an arithmetic logic unit (ALU) for performing arithmetic and logic operations, processor registers that supply operands to the ALU and store the results of ALU operations, and a control unit that fetches instructions 164 from memory 152 and executes them by directing the coordinated operations of the ALU, registers and other components.

The processor 154 is in operative communication with memory 152 and configured to implement various instructions 164 stored in memory 152. The processor 154 may be a special-purpose computer designed to implement the instructions 164 and/or functions disclosed herein. For example, processor 154 may be configured to provide activity data 158 and models 156A-156N to processor 140 of the threat model monitoring system 110.

While FIG. 1 shows the active system 150, which includes a single processor 154 and a single memory 152, the active system 150 may include any suitable number and combination of processors 154 and memories 152 and any other necessary components. Only one processor, e.g., 154, and one memory, e.g., 152, are shown in FIG. 1 for simplicity.

Threat Model Monitoring System: Memory

Memory 130 may be any type of storage for storing a computer program comprising instructions 138, a virtual system model 136, test data 132, machine learning algorithms 134, and hash algorithms 135. The memory 130 may be a non-transitory computer-readable medium in operative communication with the processor 140. The memory 130 may be one or more disks, tape drives, or solid-state drives. Alternatively, or in addition, the memory 130 may be one or more cloud storage devices. The memory 130 may be volatile or non-volatile. It may comprise read-only memory (ROM), random-access memory (RAM), ternary content-addressable memory (TCAM), dynamic random-access memory (DRAM), and static random-access memory (SRAM).

The memory 130 stores instructions 138 that, when executed by the processor 140, causes the processor 140 to perform the operations described in FIGS. 1 and 2 below. Instructions 138 may comprise any suitable set of instructions, logic, rules, or code. The memory 130 may include storage that may take the form of a database for storing such things as the test data 132. These may be stored and recalled using known protocols such as SQL, XML, and/or any other protocol or language that a user, administrator, or developer of the system 100 wishes to use. The virtual system model 136, test data 132, machine learning algorithms 134, and hash algorithms 135 may be stored in other forms, and the disclosure is not limited to storing virtual system model 136, test data 132, and machine learning algorithms 134 as a database.

The memory 130 in one or more embodiments stores test data 132. Test data 132 stores activity data 158 related to the performance on one or more normal activities 160 or data for similar activities. The test data 132 in one or more embodiments also includes activity data 172 from previous threats that have been detected by an external source 170 and/or activity data 158 identified by the processor 154 of the active system 150 performing normal activities 160 and threat monitoring operation 162. Alternatively, or in addition, test data may include activity data 192 provided by one or more user devices 190. The test data 132 may be used along with the virtual system model 136 to perform the model monitor operation 144. In one or more embodiments, the test data 132 may include activity data from at least one previous threat detected by threat monitor operation 162 performed by the processor 154 of active system 150 and/or from the external source 170.

In one or more embodiments, the test data 132 is updated using additional activity data, e.g., 158 received from the active system 150, user devices 190, and/or external source 170. The updated test data 132 includes new data sets including new data sets associated with at least one new threat. The updated test data 132 may be used by processor 140 to perform the model monitor operation 144 as described below.

The memory 130 in one or more embodiments stores machine learning algorithms 134 and hash algorithms 135. The machine learning algorithms 134 may include any useful machine learning algorithms 134, such as, but not limited to, neural networks such as a convolutional neural network (CNN) and long short-term memory (LSTM) neural networks. In at least one embodiment, the machine learning algorithm 134 may be used by processor 140 when performing a threat data monitor operation 142 and any other operation or application performed by processor 140. Hash algorithm 135 similarly may be used by the processor 140 when performing a threat data monitor operation 142. It may include any standard hash algorithm 135 that is useful for determining if a threat or attack is present in activity data, e.g., 158, by calculating a hash value for the activity data, e.g., 158, and determining if it is different from the expected hash value for the activity data, e.g., 158. The hash algorithm 135 may take any form such as, but not limited to, secure hash algorithms (SHA) such as SHA-2, SHA-3, or any other hashing algorithm 135 that is commonly used and/or will provide a good indication that the data involved in performing an activity has been altered or is fraudulent. The memory 130 may store additional or other machine learning algorithms 134 and hash algorithms 135. The machine learning algorithms 134 and the hash algorithms 135 are not limited to those just described.

The memory 130 in one or more embodiments stores a virtual system model 136. The virtual system model 136 may include an image or simulation of a system such as the active system 150 and/or external source 170. The virtual system model 136 may be a virtual secured environment separated from the rest of system 100 and/or has other means, such as air gapping, to keep any errors or fraud caused by the test data 132 from affecting the system 100. The virtual system model 136 may include sufficient details that the processor 140 performing the model monitor operation 144 may make an adequate analysis of how one or more models 156A-156N may detect the test data 132. In one or more embodiments, the virtual system model 136 may be a sandboxed model of the active system 150. While only one virtual system model 136 is shown, multiple virtual system model 136 may be stored in memory 130. The virtual system model 136 may take any form without departing from the disclosure.

Threat Model Monitoring System: Processor

The processor 140 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 140 may be a programmable logic device, a microcontroller, a microprocessor, or any suitable combination of the preceding. The processor 140 is communicatively coupled to and in signal communication with the memory 130. One or more processors make up the processor 140 and are configured to process data, which may be implemented in hardware or software. For example, the processor 140 may be 8-bit, 16-bit, 32-bit, 64-bit, or of any other suitable architecture. The processor 140 may include an arithmetic logic unit (ALU) for performing arithmetic and logic operations; processor registers that supply operands to the ALU and store the results of ALU operations, and a control unit that fetches instructions 138 from memory 130 and executes them by directing the coordinated operations of the ALU, registers and other components.

The processor 140 is in operative communication with the memory 130. The processor 140 is configured to implement instructions 138 stored in memory 130. The processor 140 may be a special-purpose computer designed to implement the instructions 138 and/or functions disclosed herein. For example, the processor 140 may be configured to perform operations, including the operations of the methods described in FIG. 2.

The processor 140 uses the virtual system model 136, test data 132, and machine learning algorithm 134 to perform various operations such as, but not limited to, a model monitor operation 144 and threat data monitor operation 142. The processor 140 may perform more or less operations than shown in FIG. 1 and described in FIG. 2; the specific operations shown are only examples. While a single processor 140 is shown, the processor 140 may include a plurality of processors or computational devices. The operations, e.g., model monitor operation 144 and threat data monitor operation 142, are described herein as being performed by the processor 140 and may be performed by a separate processor 140 or software application executed on a single computational device, e.g., processor 140, or they may be located on separate servers, separate datacenters such as a cloud server, and/or the active system 150 or external sources 170.

The processor 140, in one or more embodiments, receives activity data 172 from the external source 170, activity data 192 from the user device 190, and activity data 158 from the active system 150. The activity data, e.g., 158, is received by the processor 140 from the network 180 or directly and processed by the processor 140 performing a threat data monitor operation 142. In one or more embodiments, the threat data monitor operation 142 uses machine learning algorithms 134 and/or hashing algorithms 135 to identify potential threats in the activity data, e.g., 158. Alternatively, or in addition, the processor 140 performing the threat data monitoring operation 142 may determine that the activity data, e.g., 158, includes data related to a threat based on detecting one or more patterns in two or more variables and metrics of the activity data, e.g., 158.

As previously discussed, the processor 140 performing the threat data monitor operation 142 utilizes one or more machine learning algorithms 134 to determine if activity data, e.g., 158, includes data related to a threat. The machine learning algorithms 134 are used by the processor 140 performing the threat data monitor operation 142 to identify when a probability is greater than a predetermined probability that has been determined to indicate that the activity data, e.g., 158 is probably threat data. The predetermined probability may be determined by a user, administrator, security professional, regulatory agency, or other concerned entity. The predetermined probability may be based on the specific type of machine learning algorithm 134 being used and/or the normal activities 160 performed by processor 154 of active system 150. For example, in a non-limiting example, the predetermined probability may be low when the normal activities 160 are related to financial transactions. In contrast, they may be relatively high for normal activities 160 pertaining to social media.

In one or more embodiments, the activity data, e.g., 172, may alternatively or additionally include indications that one or more data sets that comprise the activity data, e.g., 172, are associated with at least one threat. The processor 140 performs the threat data monitor operation 142 and stores activity data, e.g., 172 in the memory as test data 132. When the processor 140 receives new activity data, e.g., 158, this additional activity data, e.g., 158, is stored in the test data 132, updating the test data 132. The test data 132 includes at least activity data having data sets from a threat that was previously detected, and when updated, the test data 132 may include, in addition, activity data, e.g., 172 that includes new data sets associated with at least one new threat.

When the processor has updated the test data 132 in memory 130 to include updated or new test data 132, the processor 140 then performs a model monitor operation 144. When performing the model monitor operation 144, the processor 140 retrieves the test data 132 and the virtual system model 136 from the memory 130. The processor 140 utilizes the virtual system model 136 to produce a virtual system that may include one or more aspects of system 100, including at least the actives system 150 and/or other devices (not shown). The virtual system model 136 further uses one or more models 156A-156N to perform a virtual threat monitor operation 162 using the test data 132.

The processor 140 performs the model monitor operation 144 and then determines if one or more of the models 156A-156N is able to detect at least any new threats in the test data 132. If one or more of the models 156A-156N is unable to detect one or more of the new threats in the test data, the processor 140 then sends an alert 148 and/or performs a threat mode updater operation 146. The alert 148 notifies the user of the user device 190 that one or more of the models 156A-156N needs to be replaced or modified.

In one or more embodiments, processor 140 automatically performs a threat model update operation 146 on at least one of the models 156A-156N that is unable to detect one or more threats in the test data 132. The threat model updater operation 146 may obtain a new threat model 174 from an external source 170 or change one or more current model parameters, e.g., 156A, to create a modified threat model 147. Such changes to the parameters may include increasing or decreasing a value that indicates to the threat model, e.g., 156A, that a threat has occurred, for example, when the threat model, e.g., 156A, is monitoring a financial application. This may include changing the threat model, e.g., 156A, to adjust for larger amounts becoming the norm due to inflation or other reasons. In another example, it may change the number or type of characters required for a password as attackers develop new techniques for breaking passwords. Different parameters or values may be changed by the processor 140 performing a threat model updater operation 146 without departing from the disclosure. While described as being performed automatically, in one or more embodiments, the processor 140 may perform the threat model updater operation 146 after receiving an indication from the user device 190 that the user, administrator, or other party authorizes the processor 140 to perform the threat model updater operation 146.

The processor 140 may perform more or less of the operations shown in FIG. 1. The processor may perform the operations in any form or sequence, including those described below regarding the method 200 shown in FIG. 2.

Automated Threat Detecting Model Monitoring Process

Figure 2:
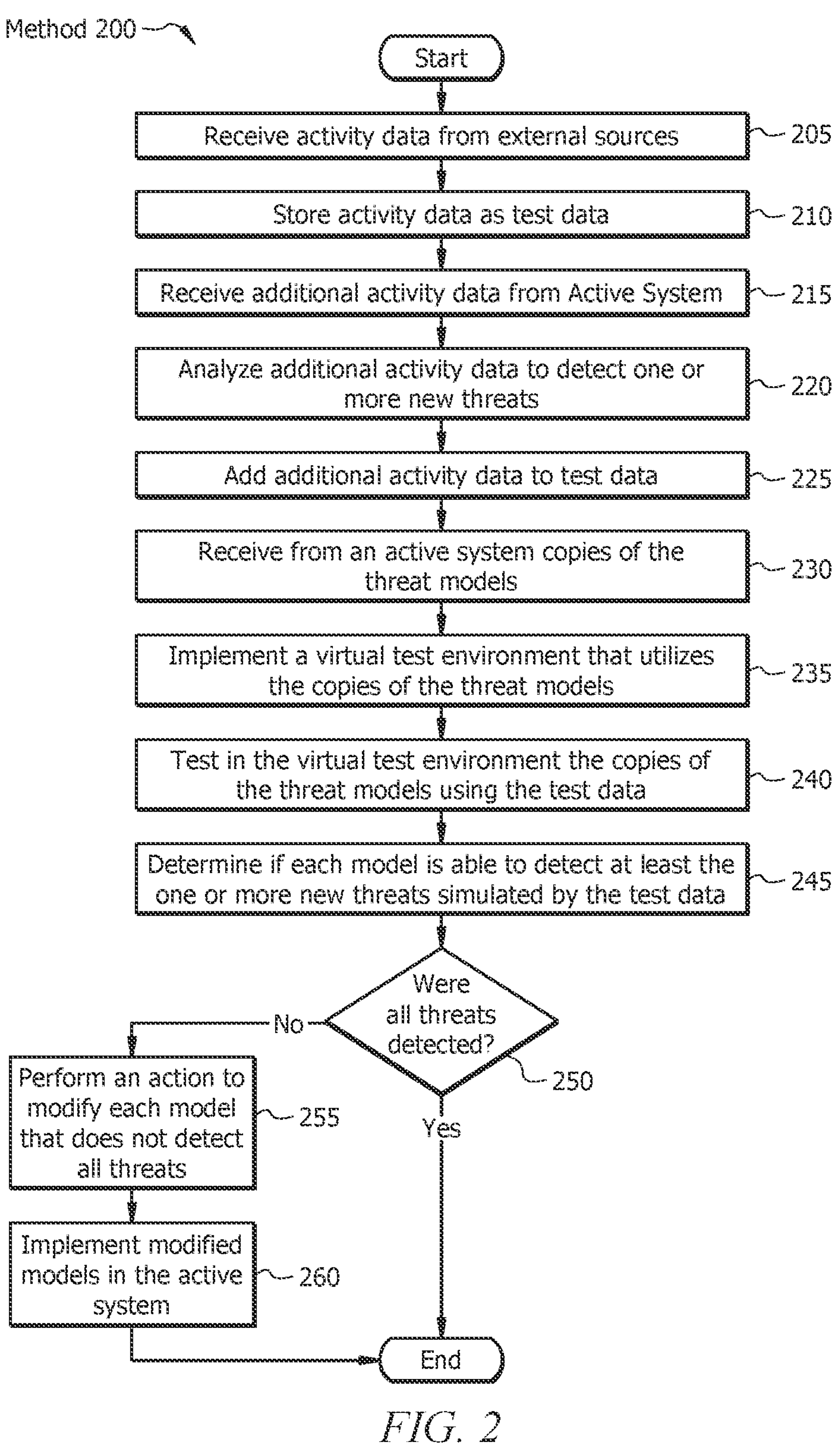
FIG. 2 illustrates one embodiment of a flowchart for automatically monitoring threat detecting models.

FIG. 2 is a flowchart of an embodiment of method 200 for monitoring threat detecting models 156A-156N by the processor 140. The processor 140 may execute instructions 138 stored in memory 130, which employs method 200 for monitoring threat detecting models 156A-156N.

The method 200 begins at operation 205. In operation 205, processor 140 receives activity data 172 from the external sources 170. In one or more embodiments, activity data 192 and activity data 158 may also be received by the processor 140 from the user device 190 and active system 150. The activity data, e.g., 172, may be one or more data sets associated with any activity performed by the external sources 170, user device 190, and/or active system 150. In one or more embodiments, the activity data, e.g., 172, includes activity data from at least one previously detected threat. Once the processor 140 receives the activity data, e.g., 172 from the external sources 170, user device 190, and/or active system 150, the processor 140 stores the activity data, e.g., 172 as test data 132 in the memory 130 in operation 210.

Once the activity data, e.g., 172, is stored as test data 132 in operation 210, the processor 140 may receive additional activity data, e.g., 158, from the active system 150 and/or the external sources 170 in operation 215. This activity data, e.g., 158, is analyzed by the processor 140 in operation 220, performing a threat data monitor operation 142. The processor 140 in operation 220 may use machine learning algorithms 134 to analyze the additional activity data, e.g., 158, and/or other techniques, such as performing a hash algorithm 135 to determine if the activity data, e.g., 158 indicates possible tampering or other types of attack. The machine learning algorithm 134 may indicate that the additional activity data, e.g., 158, is a new attack when the machine learning algorithm 134 returns an indication that a particular activity has a probability higher than a predetermined threshold that the additional activity data, e.g., 158, is probably related to a new attack. If the machine learning algorithm 134 or other techniques determine that the additional activity data, e.g., 158, indicates a new attack, the additional activity data, e.g., 158, is labeled, and the additional activity data, e.g., 158, is added to the test data 132 in operation 225.

Once the processor 140 adds the additional activity data. e.g., 158, to the test data 132 in operation 225, the processor 140 receives from the active system 150 copies of the threat models 156A-156N that are currently in use in operation 230. The processor 140 then implements a virtual test environment that utilizes the copies of the threat models 156A-156N in operation 235. The virtual test environment is stored in memory 130 as virtual system model 136. The virtual system models may include all or some of the components of the active system 150 and/or the system 100. The virtual test environment is created so that it is walled off from the rest of system 100 to prevent any attacks in the test data from causing harm or additional harm.

Once the virtual environment is established in operation 235, the processor 140 tests the copies of the threat models 156A-156N in operation 240 using the test data 132 that was updated in operation 225. From these tests, the processor 140 is able to determine in operation 245 if each threat model, e.g., 156A, is able to detect at least one or more new threats simulated by the test data 132. If processor 140 determines in operation 250 that all the models 156A-156N successfully detect the threats, method 200 ends after operation 250.

However, if processor 140 determines that one or more threats were not detected in operation 250, processor 140 performs an action to modify each threat model 156A-156N that does not detect all the threats in operation 255. This operation 255 may include replacing one or more threat models, e.g., 156A with a new threat model 174, and/or it may include sending an alert 148 to the user of a user device 190 so that the user using the user interface 194 of the user device 190 may update or modifying one or more of the threat models, e.g., 156A, to produce a modified threat model 147. Operation 255 may be performed automatically, or after a user, administrator, or other concerned party using the user device 190 receives alert 148 and provides instructions to the processor 140 performing the threat model update operation 146.

Once operation 255 is completed, processor 140 implements the modified threat model 147 or new threat models, e.g., 174, in the active system 150, and the method ends. While shown as ending after operations 250 or 260, method 200 may be performed continuously as new activity data, e.g., 158, is produced or obtained from the active system 150 and/or external sources 170.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system for monitoring threat models, comprising:

a memory configured to store test data, wherein the stored test data comprises activity data related to an activity performed by two or more external sources and wherein the activity data includes at least one data set from at least one previous threat; and a processor operably coupled to the memory and configured to:

receive from at least one of the two or more external sources, additional activity data wherein the additional activity data includes new data sets associated with at least one new threat;

update the stored test data to include the additional activity data;

receive from the two or more external sources two or more threat models, wherein each of the two or more threat models are configured to detect the at least one previous threat, wherein at least one of the two or more external sources is a third-party developer of threat detection models;

implement a virtual test environment that comprises a simulation of an active system that utilizes the two or more threat models to detect the at least one previous threat;

use the updated stored test data in the virtual test environment to determine if each of the two or more threat models is able to detect the at least one new threat; and perform an action to modify at least one threat model of the two or more threat models, when the at least one threat model is unable to detect the at least one new threat, wherein performing the action comprises automatically replacing the at least one threat model with a new threat model obtained from the two or more external sources that is able to detect the at least one new threat, and implementing the new threat model in an active system.

2. The system of claim 1, wherein at least one of the two or more external sources is an active system that utilizes the two or more threat models, and the new data sets associated with the at least one new threat are obtained by monitoring activities performed by the active system for potential threats.

3. The system of claim 2, wherein the monitoring is performed by a machine learning algorithm that monitors the active system and determines when a particular activity has a probability that indicates that the particular activity is a new threat.

4. The system of claim 2, wherein the monitoring is performed by analyzing two or more variables and metrics of the two or more external sources and detecting at least one or more patterns indicative of a new threat.

5. The system of claim 2, wherein the monitoring is performed by using a hash algorithm on the new data sets to detect when at least one of the new data sets has a hash value that is different from an expected hash value for the at least one of the new data sets.

6. The system of claim 2, wherein the action to modify the at least one threat model comprises automatically replacing the at least one threat model with a new threat model that is able to detect the at least one new threat and implementing the new threat model in the active system.

7. The system of claim 2, wherein the action to modify the at least one threat model comprises automatically changing one or more parameters of the at least one threat model and causing the at least one threat model in the active system to use the changed one or more parameters.

8. The system of claim 1, wherein the action to modify the at least one threat model comprises alerting a user that the at least one threat model is unable to detect the at least one new threat.

9. A method for monitoring threat models:

storing test data, wherein the stored test data comprises activity data related to an activity performed by two or more external sources and wherein the activity data includes at least one data set from at least one previous threat;

receiving from at least one of the two or more external sources, additional activity data wherein the additional activity data includes new data sets associated with at least one new threat, wherein at least one of the two or more external sources is a third-party developer of threat detection models;

updating the stored test data to include the additional activity data;

receiving from the two or more external sources two or more threat models, wherein each of the two or more threat models is configured to detect the at least one previous threat;

implementing a virtual test environment that comprises a simulation of an active system that utilizes the two or more threat models to detect the at least one previous threat;

using the updated stored test data in the virtual test environment to determine if each of the two or more threat models is able to detect the at least one new threat; and performing an action to modify at least one threat model of the two or more threat models, when the at least one threat model is unable to detect the at least one new threat, wherein performing the action comprises automatically replacing the at least one threat model with a new threat model obtained from the two or more external sources that is able to detect the at least one new threat, and implementing the new threat model in an active system.

10. The method of claim 9, wherein at least one of the two or more external sources is an active system that utilizes the two or more threat models, and the new data sets associated with the at least one new threat is obtained by monitoring activities performed by the active system for potential threats.

11. The method of claim 10, wherein the monitoring is performed by a machine learning algorithm that monitors the active system and determines when a particular activity has a probability that indicates that the particular activity is a new threat.

12. The method of claim 10, wherein the monitoring is performed by analyzing two or more variables and metrics of the two or more external sources and detecting at least one or more patterns indicative of a new threat.

13. The method of claim 10, wherein the monitoring is performed by using a hash algorithm on the new data sets to detect when at least one of the new data sets has a hash value that is different from an expected hash value for the at least one of the new data sets.

14. The method of claim 10, wherein the action to modify the at least one threat model comprises automatically replacing the at least one threat model with a new threat model that is able to detect the at least one new threat and implementing the new threat model in the active system.

15. The method of claim 10, wherein the action to modify the at least one threat model comprises automatically changing one or more parameters of the at least one threat model and causing the at least one threat model in the active system to use the one or more changed parameters.

16. A non-transitory computer-readable medium storing instructions that, when executed by a processor, cause the processor to:

store test data, wherein the stored test data comprises activity data related to an activity performed by two or more external sources and wherein the activity data includes at least one data set from at least one previous threat;

receive from at least one of the two or more external sources, additional activity data wherein the additional activity data includes new data sets associated with at least one new threat, wherein at least one of the two or more external sources is a third-party developer of threat detection models;

update the stored test data to include the additional activity data;

receive from the two or more external sources two or more threat models, wherein each of the two or more threat models is configured to detect the at least one previous threat;

implement a virtual test environment that comprises a simulation of an active system that utilizes the two or more threat models to detect the at least one previous threat;

use the updated stored test data in the virtual test environment to determine if each of the two or more threat models is able to detect the at least one new threat; and perform an action to modify at least one threat model of the two or more threat models, when the at least one threat model is unable to detect the at least one new threat, wherein performing the action comprises automatically replacing the at least one threat model with a new threat model obtained from the two or more external sources that is able to detect the at least one new threat, and implementing the new threat model in an active system.

17. The non-transitory computer-readable medium of claim 16, wherein at least one of the two or more external sources is an active system that utilizes the two or more threat models, and the new data associated with the at least one new threat is obtained by monitoring activities performed by the active system for potential threats.

18. The non-transitory computer-readable medium of claim 17, wherein the monitoring is performed by a machine learning algorithm that monitors the active system and determines when a particular activity has a probability that indicates that the particular activity is a new threat.

19. The non-transitory computer-readable medium of claim 17, wherein the monitoring is performed by using a hash algorithm on the new data sets to detect when at least one of the new data sets has a hash value that is different from an expected hash value for the at least one of the new data sets.

20. The non-transitory computer-readable medium of claim 17, wherein the action to modify the at least one threat model comprises automatically replacing the at least one threat model with a new threat model that is able to detect the at least one new threat and implementing the new threat model in the active system.

* * * * *